Sept. 22, 1942.                K. E. COPPOCK                 2,296,629
                                FOOT SCRAPER
                             Filed June 27, 1941

Inventor
Kenneth E. Coppock
By
Attorneys

Patented Sept. 22, 1942

2,296,629

UNITED STATES PATENT OFFICE 2,296,629

FOOT SCRAPER

Kenneth E. Coppock, Pleasant Ridge, Mich., assignor to General Motors Corporation, Detroit, Mich., a corporation of Delaware Application June 27, 1941, Serial No. 400,066

2 Claims. (Cl. 280—164)

This invention relates to automotive vehicles and has particular reference to an improvement in the automobile body whereby a foot scraper is incorporated in the body at the door edge.

The body illustrated on the drawing has the usual doors, the bottoms of which are rather wide and cover the running board when the doors are in closed position.

The usual floor extends well outwardly toward the side edge of the body and has a rubber mat thereover at the edge which forms the runningboard. As a continuation of the runningboard, a downwardly opening channel is secured at the side of the vehicle and forms a continuation of the floor and the runningboard. This channel has a depression formed therein at each door opening and flat strips secured to the outer edge of the channel close the openings at the outside. If desired, a finishing strip may be secured over the outer strip. The closing of the depression forms an opening at the extreme outer edge of the runningboard or floor of the vehicle body at the door opening and forms a scraper to remove mud, snow, etc., from the feet of the passengers before the passengers enter the vehicle.

Figure 1:
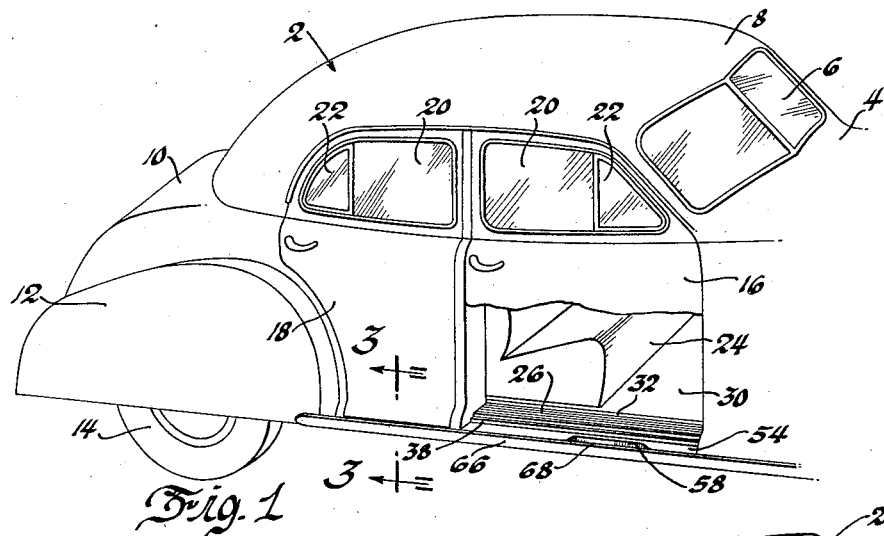
Figure 1 is a perspective view of a part of an automobile showing the invention applied. The lower half of the front door of the vehicle is broken away better to illustrate the construction.
Figure 2:
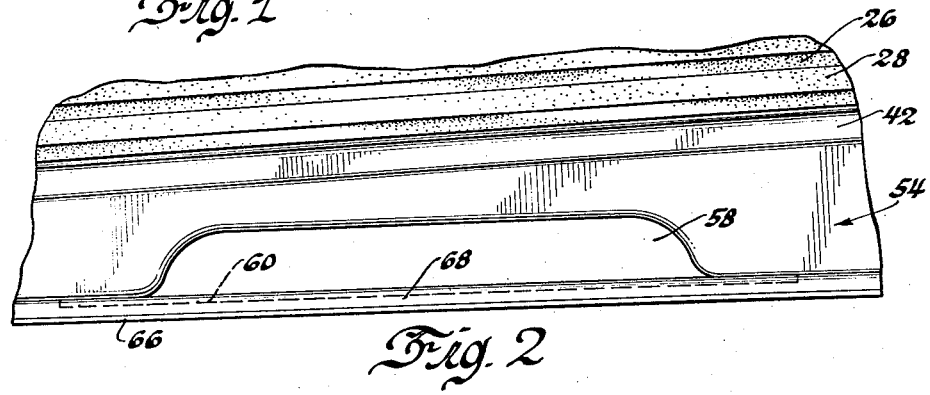
Figure 2 is an enlarged detailed view in plan of the foot scraper.

Referring to the drawing, 2 indicates an automotive vehicle as a whole. The vehicle has the usual cowl 4, windshield 6, top 8, rear deck 10, rear fender 12, and the rear wheels 14. The vehicle has the usual front door 16 and the rear door 18 provided with the raisable and lowerable windows 20 and the adjustable wind wings 22. The usual front seat is indicated at 24.

Figure 3:
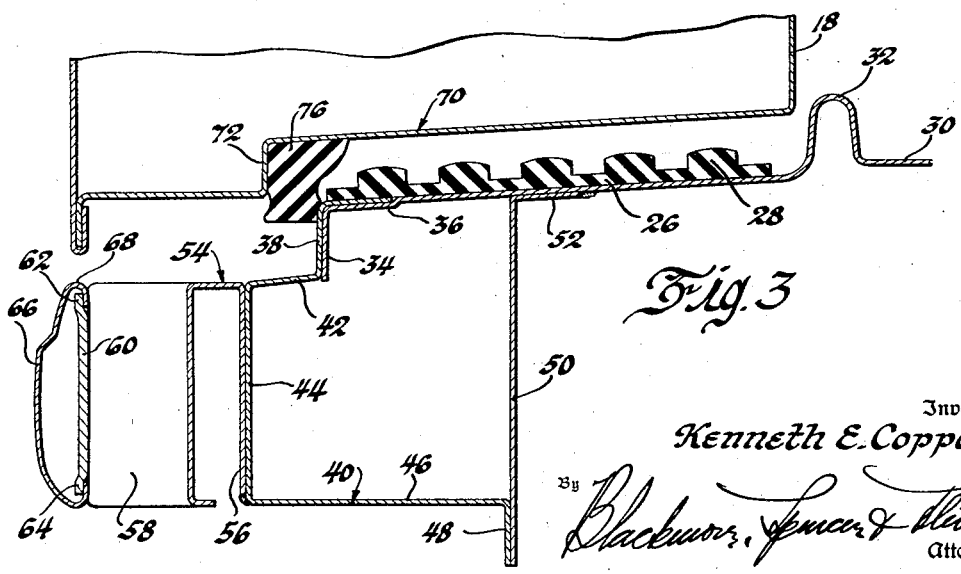
Figure 3 is an enlarged section on the line 3—3 of Figure 1.

As is best shown in Figure 3, the lower part of the doors 16 and 18 is very much widened so that in their closed position the lower part of the doors covers the running board indicated as a whole at 26. The runningboard has the mat 28 thereover and is a continuation of the floor of the vehicle indicated as a whole at 30. The floor is provided with the upwardly extending rib 32 formed at the inner edge of the doors 16 or 18 when the doors are in their closed position. The edge of the floor 30 is downwardly flanged at 34 and offset as at 36. To the flanged and offset parts 34 and 36 there is secured the flange 38 of a rocker panel indicated as a whole at 40. This panel has the shoulder 42 and the downwardly extending web 44. An inwardly extending web 46 of the rocker panel has a flange 48 at its bottom which abuts against a downwardly extending plate 50 having a top flange 52 secured to the bottom of the floor 30. The structure just described forms a longitudinal boxsectioned construction to reinforce the side of the vehicle body.

At the side of the rocker panel 40 and fitting against the upright web 44 there is secured the downwardly opening edge channel member 54. One flange 56 of the channel is secured to the flange 44 of the rocker panel.

At substantially the middle of each opening for the doors 16 and 18 the channel 54 is provided with a recessed part 58. The outer part of the recess 58 is closed by means of a plate 60 secured to the outer flange of the channel 54. The plate preferably has its upper and lower edges 62 and 64 spaced slightly from the outer face of the channel 54 and an outer finishing strip 66 is snapped over the plate 60 to give a decorative appearance to the outer edge of the runningboard.

The upper edge 68 of the finishing piece 66 reinforced by the plate 60 will form a relatively sharp edge against which the feet of the passenger entering the vehicle may be placed, and mud and snow scraped from the feet. Any loosened snow or earth will fall through the openings formed by the recess 58 and the plate 60 and fall to the ground.

The bottom edge 70 of the door is preferably stepped at 72 to conform to the shoulder at 42 and in the angle formed at the step 72 a block of rubber 76 is secured. In the closed position of the door the lower edge of the rubber 76 is adapted to strike against the upper part of the flange 38 to form a tight seal.

If desired, the floor board 30 may be continued to the extreme outer edge of the vehicle as is disclosed in the copending application of Charles L. Waterhouse, Jr., Ser. No. 374,796, January 17, 1941. In actual practice the stepped construction between the edge of the rubber mat 28 and the outer channel member 54 is preferred for the reason that any debris scraped from the feet will be prevented from being dragged into the vehicle by the upwardly extending flange at 38.

Unless otherwise described, all of the metal parts are secured to each other by welding and the rubber mat 28 and the rubber mat 76 may be secured in place by suitable fastening means.

I claim:

1. In an automobile body, an edge member secured to the outer lower edge of the body and forming a continuation of the floor and runningboard of the vehicle, one or more recessed parts formed in said member, and an outer strip secured to the edge member to close the recess and form a foot scraper.

2. In an automobile body having a door and floor, a runningboard formed at the edge of the floor and being concealed by the door in its closed position, an edge member secured to the lateral edge of the floor under the door, a recess formed in the member under the door, and an edge strip secured to the member and closing the recess to form a foot scraper.

KENNETH E. COPPOCK.